Oct. 22, 1957
E. THORESEN
2,810,298
REVERSIBLE METER ADJUSTMENT
Filed Dec. 10, 1951
2 Sheets-Sheet 1
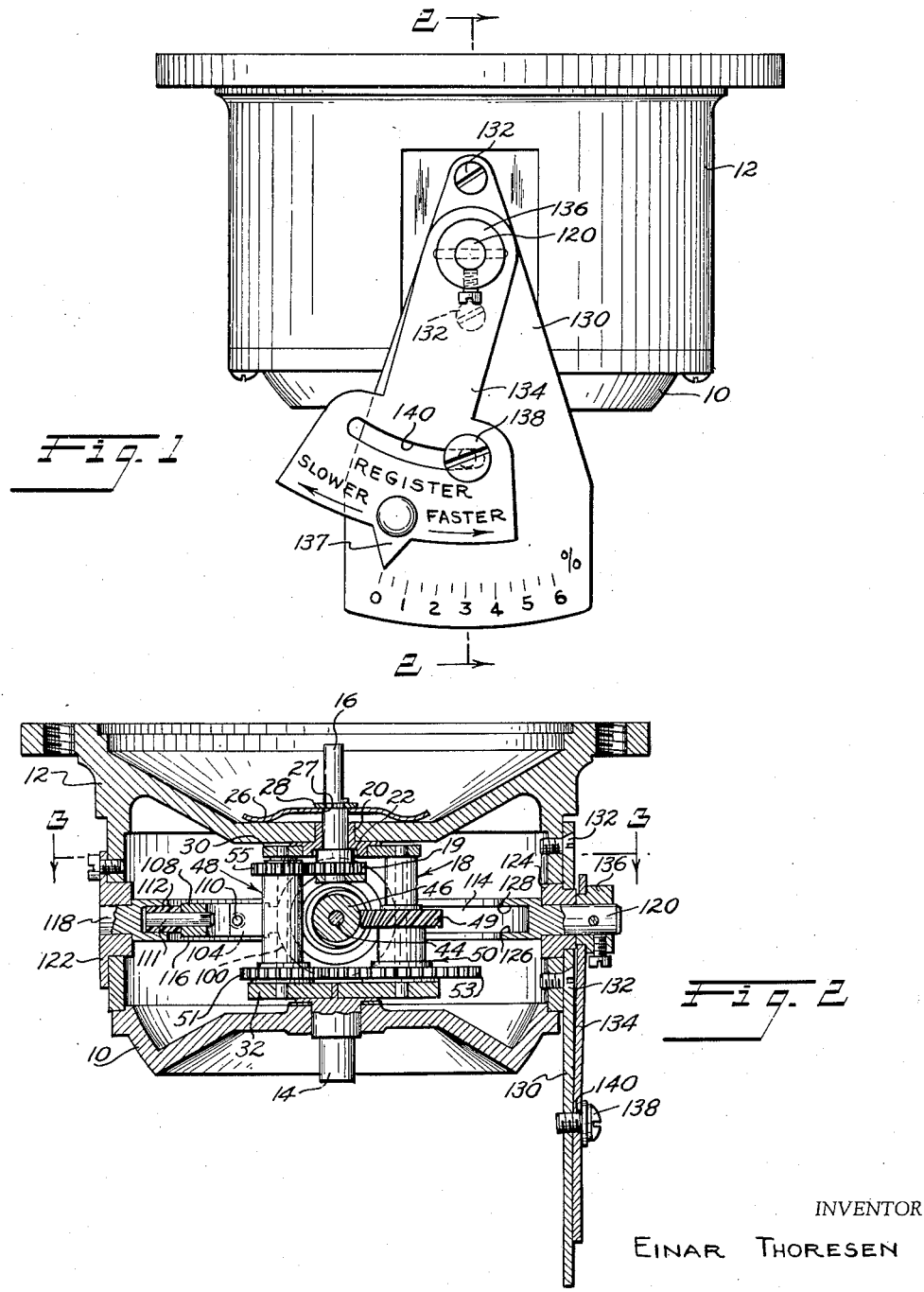
INVENTOR
EINAR THORESEN
BY Strauch, Nolan & Diggins
ATTORNEYS Oct. 22, 1957   E. THORESEN   2,810,298
REVERSIBLE METER ADJUSTMENT
Filed Dec. 10, 1951   2 Sheets-Sheet 2

INVENTOR
EINAR THORESEN
BY Strauch, Nolan & Diggins
ATTORNEYS

United States Patent Office 2,810,298
Patented Oct. 22, 1957

2,810,298

REVERSIBLE METER ADJUSTMENT

Einar Thoresen, Pittsburgh, Pa., assignor to Rockwell Manufacturing Company, Pittsburgh, Pa., a corporation of Pennsylvania Application December 10, 1951, Serial No. 260,797

9 Claims. (Cl. 74—394)

The present invention relates to improvements in that type of coupling for interconnecting rotatable driving and driven members which is adjustable to modify the angular velocity ratio between such rotatable driving and driven members within predetermined limits. More specifically, in its preferred embodiment to be herein described, the present invention relates to improvements in the specific form of such drive couplings used in meters and known as accuracy regulator mechanisms which are interposed between the output of a measuring device and the input of a registering device of a liquid meter or the like. Such mechanisms provide a variable means for bringing the registration of the registering device into accord with the actual volume of liquid passed through the measuring device. The necessity for this compensation arises from several sources such as differences in physical characteristics between different liquids and variations in the physical characteristics of a given liquid under different operating conditions. For example, such accuracy regulators are used to compensate for temperature and viscosity variations.

The accuracy regulators disclosed in United States Letters Patent No. 2,079,197, issued May 4, 1937, to C. P. Bergman, and No. 2,438,934, issued April 6, 1948, to W. H. Marsh are illustrative of prior art devices over which my present invention constitutes an improvement.

In certain meter installations, it may be necessary for fluid to pass through the measuring device of a meter in either forward or reverse directions. An example of such an installation is a meter for a storage tank into which the fluid is supplied and from which fluid is withdrawn through a common line connection. For such meter installations, since it is usually desired to accurately measure the flow both into and out of the storage tank so that an accurate indication of the quantity of fluid retained in the tank is available, it is imperative that the meter be equally accurate in its flow registration for both directions of fluid flow through the measuring device.

The accuracy regulators heretofore available such as those of the above-identified patents, have not been capable of effecting such accuracy of registration for both directions of fluid flow through the meter, and this invention solves that problem.

It is, therefore, the primary object of my present invention to provide an accuracy regulator for meters which is of such improved construction that the accuracy of the meter registration can be regulated for fluid flow in either direction through the measuring device of a meter.

It is a further object of my invention to provide an improved accuracy regulator which is effective to regulate the accuracy of flow registration for either direction of flow of fluid through the measuring device of the meter and in which the accuracy compensation for both directions of fluid flow is effected by manipulation of a single adjustment.

More specifically it is an object of my invention to provide as an accuracy regulator for meters a drive coupling for interconnecting rotatable driving and driven members which is adjustable within a predetermined range to effect a modification of the angular velocity ratio between such rotatable members which is common to both directions of rotation of such members.

Still more specifically, it is an object of my invention to provide a single compact mechanism for this purpose which comprises basically a first gear rotatable with the driven member, a support rotatable with the driving member, a second gear rotatable with and relative to the support in constant mesh with the first gear, and a mechanism cyclically operable in timed relation with the rotation of the support to impart rotation to the second gear relative to the support which is of a variable amplitude and of a sense corresponding to the driving member sense of rotation so that the angular velocity ratio between the driving and driven members can be modified within predetermined limits to effect equally accurate meter registration in both directions of fluid flow therethrough.

These and other objects of my invention will become apparent as the following detailed description proceeds in reference to the accompanying drawing wherein like reference numerals have been used throughout the several views and wherein:

Figure 1 is a side elevational view of the present preferred form of accuracy regulator embodying the principles of my invention;

Figure 2 is a vertical sectional view of such accuracy regulator taken substantially along the line 2—2 of Figure 1;

Figure 3:
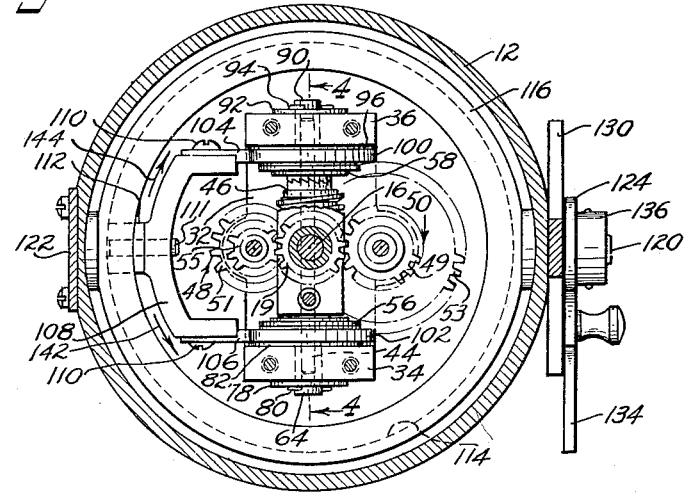
Figure 3 is a sectional plan view of such accuracy regulator taken substantially along line 3—3 of Figure 2.

Referring first to Figures 1 and 2 of the drawings, the accuracy regulator of my present invention is provided with a housing support structure formed of mating lower and upper housing parts 10 and 12 upon which are journalled respectively a driving or input shaft 14 and a driven or output shaft 16. When this mechanism is coupled as an accuracy regulator in a fluid meter, the input shaft 14 is driven by the measuring device of such a meter and the output shaft 16 is coupled to drive the registering mechanism thereof. In the disclosed embodiment of my invention, shafts 14 and 16 are coaxially aligned.

A mechanism, generally designated 18, forms a positive drive connection between shafts 14 and 16 to establish a predetermined angular velocity ratio between shafts 14 and 16 which is common to the two possible directions of rotation of these shafts. In the disclosed embodiment, the predetermined angular velocity ratio between shafts 14 and 16 is 1:1. The coupling mechanism 18, as will appear presently, may be adjusted within fixed limits to modify this predetermined angular velocity ratio between the shafts 14 and 16.

The basic structure of the preferred embodiment of my invention comprises a first gear fixed for coaxial rotation with the output shaft 16, a support fixed for coaxial rotation with the input shaft 14, a second gear mounted on the support for rotation therewith and relative thereto in constant mesh with the first gear, and a mechanism operable irrespective of the direction of rotation of the shafts 14 and 16 to cyclically impart rotational movement of a controllable amplitude to the second gear relative to the support in timed relation to the support rotation.

The said first gear is gear 19 which is suitably fixed near the lower end of shaft 16 below a bushing 20 by which shaft 16 is journalled upon upper housing part 12. The upwardly projecting hub of gear 19 extends into a recess 22 formed coaxially in the adjacent face of bushing 20, the end face of that hub being resiliently biased into abutment with the end wall of recess 22 to provide a slight drag upon the output shaft for a purpose which will appear presently.

The resilient upward bias of gear 19 and shaft 16 is produced by an elongated leaf or compression spring 26 which, at its ends, bears upon the external surface of the housing part 12, and is centrally apertured at 27 to rotatably pass shaft 16 therethrough. In the illustrated position of Figure 2, spring 26 is partially flexed, a spring clip 28 being fixed on shaft 16 to limit upward axial movement of the spring 26 relative to the shaft 16 and to hold spring 26 under compression.

Figure 4:
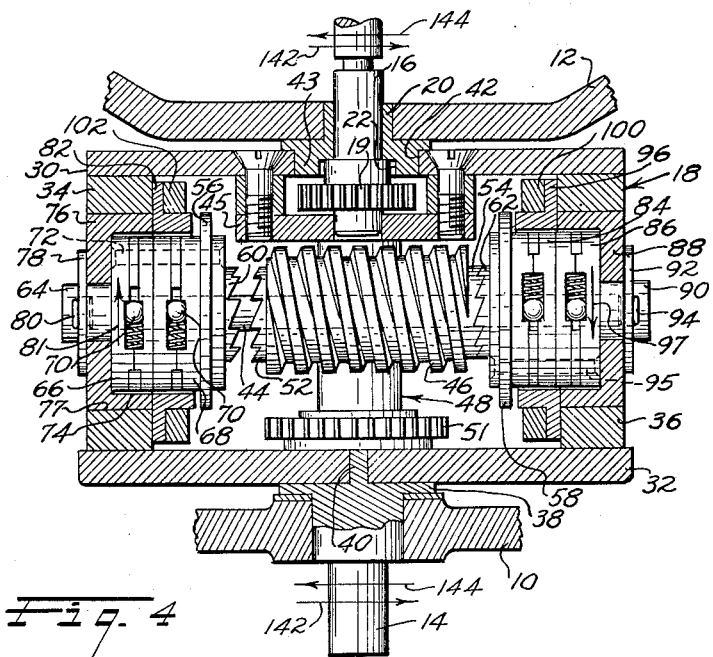
Figure 4 is an enlarged fragmentary sectional view of my accuracy regulator taken substantially along the line 4—4 of Figure 3.

The said support fixed for rotation upon the input shaft 14 is a cage-like structure shown best in Figure 4 and formed of top and bottom plates 30 and 32 which are held in spaced parallel relation by parallel end members 34 and 36. Members 30, 32, 34 and 36 are suitably secured together, as by screws (not shown), to form a rigid cage-like support structure. The lower plate 32 is fixed for rotation with the input shaft 14, input shaft 14 being formed with a radially extending flange 38 and a coaxially aligned upwardly projecting pin 40 to respectively support and align the plate 32 relative to the shaft 14. The shaft 14 and plate 32 are suitably secured together to form a unitary structure as by brazing.

The upper plate 30 has a central cylindrical aperture 42 which receives a downwardly projecting cylindrical portion 43 of the bushing 20 to provide an upper radial and thrust pilot bearing for the cage-like support. The lower end of shaft 16 is journalled below gear 19 in a spaced plate 45 rigid with upper support plate 30.

As is shown in Figure 4, the end members 34 and 36 support a through shaft 44, the axis of which is normal to the support axis of rotation and upon which is axially slidably and rotatably mounted a worm 46. As is shown in Figure 2, a pair of gear clusters 48 and 50 are journalled respectively for rotation between the upper and lower plates 30 and 32 on opposite sides of the worm shaft 44 about axis spaced from and parallel to the common axis of shafts 14 and 16. The upper gear 49 of gear cluster 50 is a worm wheel which is in constant meshing engagement with the worm 46. The lower gears 51 and 53 of clusters 48 and 50 are constantly meshed with each other. The upper gear 55 of cluster 48 is in constant meshing engagement with the gear 19 on the output shaft 16.

From the structure thus far described, it is apparent that if the gear cluster 48 is held against rotation relative to the cage-like support upon which it is journalled, rotation of the input shaft 14 will produce rotation of the output shaft 16 at a like angular velocity, the support and gears forming a rigid drive connection therebetween. It is further apparent that, if the gear cluster 48 is caused to rotate a given amount relative to the cage-like support upon which it is journalled during the rotation of the input shaft and the cage-like support, the angular velocity of the output shaft 16 will be modified proportionately. Modification of the amount of rotation of gear cluster 48 during each cycle of rotation of input shaft 14 will produce a corresponding modification in the angular velocity ratio between shafts 14 and 16. Rotation of gear cluster 48 relative to the cage-like support upon which it is journalled is controlled through the direct drive connection from gear cluster 50 by controlled rotary actuation of worm 46.

As shown in Figure 4, the opposite ends of worm 46 are formed respectively with sets of ratcheted clutch teeth 52 and 54. At the left end of worm 46, as viewed in Figure 4, a first worm driving member 56 is mounted for unidirectional coaxial rotation relative to worm shaft 44, while at the opposite end of worm 46, a second worm driving member 58 is similarly mounted for unidirectional coaxial rotation relative to worm shaft 44 in a direction opposite that of member 56. Members 56 and 58 are formed respectively with sets of clutch teeth 60 and 62 which are complementary to and adapted respectively to be drivingly engaged with clutch teeth sets 52 and 54 upon the worm 46.

As was previously pointed out, worm 46 is rotatably and axially slidably received upon the shaft 44. Also, as has been previously pointed out, the spring 26 (Figure 2) biases the end of the hub of gear 19 into surface contact with the end wall of the recess 22 of bushing 20 to produce a slight drag upon the gear train formed by gear 19 and gear clusters 48 and 50. As a result of this slight drag, rotation of the cage-like support will produce an axial thrust upon worm 46 which, so long as the direction of rotation of the input shaft 14 remains constant, will urge the worm 46 into driving engagement with one of the driving members 56 or 58. Upon reversal of the direction of rotation of input shaft 14, shaft 16 and gear 19 will be temporarily restrained against rotation by spring 26 thus causing a slight rotation of gear clusters 48 and 50 which in turn will cause the worm 46 to slide axially of shaft 44 to drivingly engage the other of such driving members.

Driving member 56 is fixed to a sleeve 64 which surrounds and is rotatable relative to shaft 44 and upon the exterior of which is received a pair of unidirectional clutches 66 and 68 in juxtaposition with the driving member 56. The clutches 66 and 68 are of the spring biased ball type, each having a plurality of spring biased balls 70 disposed around the periphery thereof. Clutches 66 and 68 are fixed to the driving member 56 by spaced rivets, such as 72. Clutch 66 is received within a recess 74 in a retainer 76 which is fixed within an aperture 77 through end member 34 of the support.

The tubular member 64 projects through an aperture in the end wall of the recess 74 and is provided exteriorly of retainer 76 with a washer 78 and cotter pin 80 to axially fix tubular member 64, driving member 56, and clutches 66 and 68 relative to the retainer 76 and end member 34 of the cage-like support. The balls 70 of the clutch 66 engage the cylindrical wall of recess 74 to prevent relative rotation between the clutch 66 and the retainer 76 in the direction opposite to that indicated by the arrow 81 and to permit rotation of the clutch 66 relative to the retainer 76 in the direction of the arrow 81 in the conventional manner of clutches of this type. Clutch 66 thus serves as a detent to prevent reverse rotation of the driving member 56.

A collar 82 surrounds and operatively engages the balls 70 of clutch 68 in a manner similar to that in which the balls 70 of clutch 66 engage the recess 74 of retainer 76. Clutches 66 and 68 are operative in the same direction so that, when collar 82 is rotated in the direction indicated by the arrow 81, a drive connection is established through the balls 70 between collar 82 and the clutch 68. During such rotation, the balls 70 of the clutch 66 are forced against their associated springs to permit rotation of the clutches 66 and 68 and the drive member 56 relative to the retainer 76. When the collar 82 is rotated in the direction opposite to that indicated by the arrow 81, clutches 66 and 68 and drive member 56 are held against rotation relative to the cage-like support by the engagement of the balls 70 of the clutch 66 with the cylindrical wall of the recess 74 of the retainer 76, rotation of the collar 82 relative to the clutch 68 being possible due to the compression of the springs associated with the balls 70 thereof.

The worm driving member 58 is similarly provided with ball clutches 84 and 86, a retainer 88, a sleeve 90, a washer 92, a cotter pin 94, rivets 95, and a collar 96. The structure and function of these parts are identical with the corresponding parts associated with worm driving member 56 with the exception that clutches 84 and 86 are operable in a direction opposite to that of clutches 66 and 68 so that worm drive member 58 is rotatable only in the direction indicated by the arrow 97.

In order to impart rotary movement to the worm driving members 56 and 58 in timed relation with the rotation of input shaft 14, I have provided a linkage, now to be described, which causes the collars 82 and 96 to oscillate conjointly through limited rotary paths about the worm shaft axis once during each cycle of rotation of the input shaft 14. Movement of collars 82 and 96 in the direction of arrow 81 during one half of their oscillatory cycle will only drive worm driving member 56, and reverse movement of collars 82 and 96 in the direction of arrow 97 will only drive worm driving member 58. The amplitude of oscillation of collars 82 and 96 may be varied from zero to a maximum predetermined value which is, of course, dependent upon the maximum amount of angular velocity ratio variation that is desired for accuracy regulation of the type of meter with which the mechanism is to be used.

The linkage controlling the oscillation of collars 82 and 96 is best shown in Figures 2 and 3, the illustrated configuration of that mechanism corresponding to a zero amplitude of oscillation of collars 82 and 96. This linkage includes a pair of like collars 100 and 102 which are formed respectively with projecting ears 104 and 106 between which is fixed a yoke 108 by screws 110. Collars 100 and 102 are received upon reduced portions of collars 96 and 82 respectively as is shown in Figure 4, and are fixed thereto in any suitable manner. As is shown in Figures 2 and 3, a pin 111, upon the end of which is rotatably mounted a cam follower slide block 112, is fixed centrally of yoke 108, the axis of pin 111 extending normal to and intersecting the axis of shaft 44. Cam follower 112 operatively engages an annular cam track forming groove 114 formed internally of a ring 116. Ring 116 is pivotally mounted above a diametral axis by pivot pins 118 and 120 which are pivotally received within bushings 122 and 124 respectively. The bushings 122 and 124 are so fixed in diametrically opposed apertures through the cylindrical side wall of upper housing member 12 that the pivot axis of ring 116 intersects and is normal to the common axis or rotation of shafts 14 and 16.

In the illustrated position of ring 116, the planes of the parallel top and bottom walls 126 and 128 of groove 114 are normal to the axis of shafts 14 and 16 so that, as shaft 14 rotates, cam follower 112 and yoke 108 will rotate therewith but their pivotal movement about the axis of shaft 44 will be zero. Under this condition worm 46 is held stationary and locks gear cluster 48 against rotation on its axis. If, however, ring 116 is pivoted about its axis to a position in which the parallel planes of the walls 126 and 128 of groove 114 are inclined relative to the axis of shafts 14 and 16, during each cycle of rotation of shaft 14, follower 112 and yoke 108 will be depressed below their illustrated positions for one half of such cycle and elevated above that position for the other half of such cycle.

Thus, inclination of ring 116 produces oscillation of yoke 108 and the collars 82 and 96 to drive the worm drive members 56 and 58 during alternate halves of the cycle of rotation of shaft 14. An increase in the inclination of ring 116 will produce a corresponding increase in the amplitude of movement of members 56 and 58.

With reference to Figures 3 and 4 it will be seen that if shaft 16 is driven by shaft 14 in the direction of arrow 142 by the interlocking of worm 46, worm gear 49, gears 53, 51 and gear 55 in engagement with gear 19, an additional predetermined amount of forward movement in the same direction (arrow 142) is imparted to shaft 16 by the upward movement (Figure 3) of slide block 112 in tilted track 114 of ring 116 and yoke 108, causing a turning movement to collar 96, clutches 84, 86 and member 58 and causing worm 46 to turn in the direction of arrow 97. The turning movement of worm 46 in direction of arrow 97 transmitted through worm gear 49 and gears 53, 51 and 55 to gear 19 on shaft 16 will cause shaft 16 to turn an additional amount in the same direction (arrow 142).

When meter rotation is reversed, drive shaft 14 with the cage assembly will turn in direction of arrow 144, and worm 46 will slide toward the left (Figure 4) thereby disengaging the right hand driving clutch assembly and engaging clutch teeth 52 and 60.

Output shaft 16 will be driven by the interlocked gears as above described in direction of arrow 144 and will at the same time receive an additional forward movement due to the turning of worm 46 in direction of arrow 81 (Figure 4).

This additional forward movement of shaft 16 in the direction of arrow 144 is imparted by the downward travel (Figure 3) of slide block 112 in track 114 of tilted ring 116 imparting a rotary motion to collar 82 in direction of arrow 81. This motion in turn is transmitted through clutch 68, clutch teeth 60 and 52, worm 46, worm gear 49 and gears 53, 51 and 55 to shaft 16 by gear 19.

It will thus be seen that a movement of worm 46 in direction of arrow 81 will cause output shaft 16 to turn an additional amount for each revolution of shaft 14 and in the same direction (arrow 144).

In order to facilitate the adjustment of the inclination of ring 116, I have provided an indicator plate 130, fixed to the upper housing member 12 by screws 132, and a coacting indicator arm 134, which is suitably fixed to a collar 136 which is in turn fixed upon an extension of pivot pin 120 of ring 116. As is shown in Figure 1, plate 130, which is provided with suitable indicia forming a scale indicative of the percentage of change of angular velocity of output shaft 16, and an indicator arm 134, which is provided with a pointer 137, coact to form a convenient indicating mechanism to facilitate adjustment of the angular velocity ratio between shafts 14 and 16. A screw 138, which extends through an elongated arcuate slot 140 in arm 134, is threadedly engaged with plate 130 so that by manipulation of screw 138, arm 134 may be clamped to or released from plate 130 to respectively fix or release ring 116.

From the foregoing detailed description it is apparent that I have provided a simple and compact drive coupling for interposition between a registering mechanism and a measuring device of a meter which is adjustable to modify the angular velocity ratio between the input of the former and the output of the latter to any value within the range of the adjustment for either direction of drive therebetween.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, support structure, an input shaft rotatable in either a forward or a reverse direction, an output shaft similarly reversibly rotatable, a drive connection comprising a system of gearing between said shafts establishing a predetermined angular velocity ratio therebetween common to both directions of rotation thereof, two one way clutches, one or the other of which is automatically engaged with said gearing depending upon the direction of rotation of said input shaft, and means operable upon said drive connection to modify such common angular velocity ratio, said last-named means comprising a cam and follower connection between said clutches and said support structure which, when operative, is cyclically effective in timed relation to the rotation of said input shaft to impart an ancillary movement to said output shaft which is superimposed upon the normal movement imparted thereto from said input shaft through said drive connection and which is common to both directions of rotation of said input shaft.

2. In combination, an input shaft and an output shaft journalled for rotation about a common axis, a cage mounted on said input shaft for rotation therewith, a worm journalled on said cage for rotation about an axis normal to said common axis, first and second worm drive members disposed respectively at the opposite ends of said worm, means mounting said first drive member for unidirectional rotation coaxially with said worm, means mounting said second drive member for unidirectional rotation coaxially with said worm in a direction opposite to that of said first drive member, means cyclically operative in timed relation with the rotation of said input shaft for alternately imparting such opposite unidirectional rotation to said drive members, means adjustable to vary the amplitude of rotational movement imparted to said drive members between predetermined limits, means responsive to the direction of rotation of the said input shaft for alternatively establishing a drive connection between said worm and one of said drive members, means including said worm and operative independently of the rotation thereof drivingly interconnecting said input and output shafts for concomitant rotation at a predetermined angular velocity ratio, said last named means being operative in response to rotation of said worm to modify such angular velocity ratio in accordance with the adjustment of said drive member rotational movement varying means.

3. The combination defined in claim 2 wherein such angular velocity ratio modification is effected by the superimposition upon the normal rotational movement of said output shaft of an ancillary movement resulting from rotation of said worm.

4. In combination in an adjustment for varying a continuous drive, a rotatable input shaft, an output gear coaxial with said input shaft and operably connected to an output shaft, a carrier rotatable with said input shaft, a first gear on the carrier, a constantly meshed gear train on the carrier interconnecting said first gear with the output gear, a second rotatable gear on the carrier constantly meshed with said first gear, a worm gear on the carrier rotatable with said second gear, an arbor normal to the input shaft axis, a worm constantly meshed with said worm gear slidable longitudinally of said arbor, worm driving members rotatable about said arbor at opposite sides of said worm, cooperating sets of clutch teeth on opposite ends of said worm and the adjacent ends of said worm driving members for opposite unidirectional drive of said worm when one or the other set of teeth is engaged, mechanism responsive to rotation of said carrier for cyclically rocking said worm driving members, means for adjusting the amplitude of such rocking, unidirectional clutch means between said worm driving members and said mechanism, and means responsive to the direction of rotation of said input shaft for shifting said worm to engage one or the other of said cooperating sets of clutch teeth whenever said input shaft is rotating, said rocking of said worm serving to impart incremental drive impulses to rotation of the output shaft from the input shaft.

5. In the combination defined in claim 4, said mechanism comprising a relatively fixed cam track, a follower for said track and linkage interconnecting said follower and both said worm driving members.

6. In combination in mechanism for varying the drive ratio between relatively rotatable input and output shafts mounted on a support, a carrier fixed on the input shaft, a first gear fixed on the output shaft, a second gear assembly rotatably mounted on the carrier in constant mesh with said first gear, a pair of unidirectional clutch jaws rotatably mounted on said carrier, a clutch collar constantly geared to said second gear assembly slidable between positions of mesh with one or the other of said clutch jaws in response to the direction of rotation of said input shaft, and cooperating means on the support and carrier for periodically rotating said clutch jaws during rotation of said carrier whereby supplemental angular movement is supplied to said output shaft, and means for adjusting the amplitude of said movement between predetermined limits.

7. In the mechanism defined in claim 6, means for exerting a light drag on said output shaft for causing shift of the clutch collar in response to a change in direction of rotation of said input shaft.

8. In the mechanism defined in claim 6, said periodic rotating means comprising a fork common to both clutch jaws and a cam track pivotally mounted on said support having a cam follower connection with said fork, and said adjusting means comprising means for adjusting and fixing the pivotal position of said cam track.

9. In combination, stationary support structure, an input shaft rotatably mounted in said support structure for rotation in either a forward or a reverse direction, an output shaft rotatably mounted in said support structure for rotation in either a forward or a reverse direction, a constantly engaged drive connection between said shafts, a pair of opposed one way clutches, means responsive to rotation of said input shaft in a forward direction for automatically engaging one of said clutches with said drive connection and responsive to rotation of said input shaft in a reverse direction for automatically engaging the other of said clutches with said drive connection, and means responsive to rotation of said input shaft in either direction for cyclically driving each of said clutches whereby supplementary drive impulses are imparted to said drive connection through the engaged clutch during both forward and reverse rotation of said input shaft.

References Cited in the file of this patent

UNITED STATES PATENTS

| 1,220,373 | Staude | Mar. 27, 1917 |
| 1,234,771 | Kiewicz | July 31, 1917 |
| 1,818,407 | Laille | Aug. 11, 1931 |
| 2,070,752 | Roes | Feb. 16, 1937 |
| 2,111,547 | Bergman | Mar. 22, 1938 |
| 2,364,915 | Pressler | Dec. 12, 1944 |
| 2,399,493 | Luehrs | Apr. 30, 1946 |
| 2,535,774 | Armelin | Dec. 26, 1950 |

FOREIGN PATENTS

| 526,599 | France | Oct. 11, 1921 |